(12) United States Patent
Howard et al.

(10) Patent No.: US 7,815,149 B1
(45) Date of Patent: Oct. 19, 2010

(54) MAGNETIC CAPTURE DOCKING MECHANISM

(75) Inventors: Nathan Howard, League City, TX (US); Hai D. Nguyen, League City, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/388,345

(22) Filed: Feb. 18, 2009

Related U.S. Application Data

(62) Division of application No. 11/340,817, filed on Jan. 20, 2006, now abandoned.

(60) Provisional application No. 60/668,875, filed on Apr. 1, 2005.

(51) Int. Cl.
 *B64G 1/64* (2006.01)
(52) U.S. Cl. .................................. 244/172.4; 244/172.5
(58) Field of Classification Search ............... 244/158.1, 244/172.4, 172.5
 See application file for complete search history.

(56) References Cited

U.S. PATENT DOCUMENTS

| | | | |
|---|---|---|---|
| 4,381,092 A | 4/1983 | Barker | |
| 4,431,333 A | 2/1984 | Chandler | |
| 4,449,684 A | 5/1984 | Hinds | |
| 4,657,211 A | 4/1987 | Fuldner et al. | |
| 4,664,344 A | 5/1987 | Harwell et al. | |
| 5,005,786 A | 4/1991 | Okamoto et al. | |
| 5,040,749 A | 8/1991 | Johnson | |
| 5,104,070 A * | 4/1992 | Johnson et al. | 244/172.4 |
| 5,125,601 A * | 6/1992 | Monford, Jr. | 244/173.1 |
| 5,364,046 A | 11/1994 | Dobbs et al. | |
| 5,449,211 A | 9/1995 | Monford, Jr. | |
| 6,045,094 A | 4/2000 | Rivera | |
| 6,275,751 B1 | 8/2001 | Stallard et al. | |
| 6,354,540 B1 | 3/2002 | Lewis et al. | |
| 6,484,973 B1 | 11/2002 | Scott | |
| 6,840,481 B1 | 1/2005 | Gurevich | |
| 6,843,446 B2 | 1/2005 | Scott | |
| 6,845,303 B1 | 1/2005 | Byler | |
| 6,866,232 B1 | 3/2005 | Finney | |

(Continued)

OTHER PUBLICATIONS

University of Texas "Electromagnetic Guidance for Autonomous Docking and Separation" http://microgravity univesity.jsc.n... activeteams.cfm?PageNum_selectees; (3pgs) May 29, 2005.

(Continued)

*Primary Examiner*—Tien Dinh
*Assistant Examiner*—Philip J Bonzell
(74) *Attorney, Agent, or Firm*—Theodore U. Ro

(57) ABSTRACT

A mechanism uses a magnetic field to dock a satellite to a host vehicle. A docking component of the mechanism residing on the host vehicle has a magnet that is used to induce a coupled magnetic field with a docking component of the mechanism residing on the satellite. An alignment guide axially aligns the docking component of the satellite with the docking component of the host device dependent on the coupled magnetic field. Rotational alignment guides are used to rotationally align the docking component of the satellite with the docking component of the host device. A ball-lock mechanism is used to mechanically secure the docking component of the host vehicle and the docking component of the satellite.

14 Claims, 4 Drawing Sheets

U.S. PATENT DOCUMENTS

| | | |
|---|---|---|
| 7,104,505 B2 | 9/2006 | Tchoryk et al. |
| 2001/0017337 A1 | 8/2001 | Holemans |
| 2002/0063188 A1 | 5/2002 | Steinsiek et al. |
| 2003/0192995 A1 | 10/2003 | Tchoryk et al. |
| 2004/0245404 A1 | 12/2004 | Kerstein |
| 2006/0145023 A1 | 7/2006 | Babb et al. |

OTHER PUBLICATIONS

Dictionary of Technology http://www.explore-technology.com/technology/M/Miniaturized satellite.html, (2pgs) May 23, 2005.

* cited by examiner

MAGNETIC CAPTURE DOCKING MECHANISM

ORIGIN OF THE INVENTION

This is a divisional application of application Ser. No. 11/340,817 filed on Jan. 20, 2006 now abandoned.

The invention described herein was made in the performance of work under a NASA contract and is subject to the provisions of Section 305 of the National Aeronautics and Space Act of 1958, Public Law 85-568 (72 Stat. 435; 42 U.S.C. §2457).

BACKGROUND

In general, a "satellite" is any object that orbits a planet or other celestial body. However, the term "satellite" is more commonly used in the art to refer to a manmade object designed to orbit Earth and carry out one or more specific functions.

While satellites were initially used to perform functions associated with space exploration and military defense, satellites are now commonly used by various entities to perform non-space and non-military functions. For example, satellites are used to observe weather conditions, provide global positioning, assist in search and rescue missions, and receive and broadcast television, radio, and phone communications.

Although the number of satellites in orbit continues to increase, the costs associated with building and launching satellites are significant. Accordingly, it is important to keep a satellite in orbit as long as possible so as to reduce the rate at which the satellite needs to be replaced. In an effort to maintain satellites in orbit, various techniques are used to service satellites while in orbit. For example, techniques are implemented to replenish a satellite's fuel or power supply and repair damaged or outdated components. One such technique involves the use of a space transportation vehicle (e.g., the United States Space Shuttle) and/or crew aboard the vehicle to acquire and service the satellite.

Facilitating the acquiring of an orbiting satellite is heavily dependent on the size of satellite. In other words, the design of a "docking" mechanism for capturing a satellite in orbit depends on the size of satellite intended to be obtained using the docking mechanism. A "large" satellite weighs over 1000 kg; a "medium" or "small" satellite weighs 500-1000 kg; a "mini" satellite weighs 100-500 kg; a "micro" satellite weighs 10-100 kg; a "nano" satellite 1-10 kg; a "pico" satellite weighs 0.1-1 kg; and a "femto" satellite weighs less than 100 g.

Large and medium/small satellites usually require a host vehicle with a relatively large payload for servicing. The actual docking of such a satellite to the host vehicle generally involves (i) the use of satellite thrusters to maneuver the satellite in a particular position and (ii) a robotic arm to "grasp" and orient the satellite in the payload of the host vehicle. Docking mechanisms for smaller satellites are disclosed in: U.S. Patent Publication No. 2003/0192995 A1, showing a harpoon mechanism that, when triggered, engages a target in such a way that it can not be pulled out of a receptacle of a receiving structure; U.S. Patent Publication No. 2004/0245404 A1, showing an apparatus having a container with a chamber therein and a motorized closing mechanism for driving a door to open or close an opening of the container into the chamber; U.S. Pat. No. 6,484,973, showing a remote cockpit system for allowing human control during proximity operations; U.S. Pat. No. 6,845,303, showing maneuvering an active vehicle in accordance with data transmitted from a target vehicle to the active vehicle, the data representing relative position and velocity between the target vehicle and the active vehicle; U.S. Pat. No. 6,866,232, showing an automated docking system having a plurality of antennas on each of a target vehicle and a chase vehicle; U.S. Pat. No. 6,840,481, showing an adjustable multipoint docking system having a plurality of adjustable grasping jaws; U.S. Pat. No. 4,664,344, showing a technique for capturing an orbiting spacecraft by attaching a grapple fixture; U.S. Pat. No. 5,449,211, showing a two-fault tolerant electromagnet attachment mechanism which is adapted for interfacing with the manipulator arm of a remote manipulator system and effecting the grapple of a target object by the attractive force of the magnetic field of one or more electromagnets; U.S. Pat. No. 6,275,751, showing a smart docking surface consisting of closely spaced cantilevered sensor/actuator structures capable of precisely repositioning an object having a ferromagnetic surface in contact with the smart docking surface; U.S. Pat. No. 6,354,540, showing a fully androgynous, reconfigurable closed loop feedback controlled low impact docking system with load sensing electromagnetic capture ring; and U.S. Pat. No. 4,381,092, showing a boom formed by spring biased telescoping tubes that is gimbaled at one end to a docking or probe space vehicle and at the opposite end to an electromagnet probe with the gimbaled joints spring biased to axially align the assembly.

SUMMARY

According to one aspect of one or more embodiments of the present invention, an apparatus for securing a satellite having a docking component comprises: an access port adapted to communicate at least one service with the satellite; a first magnet adapted to exert a magnetic force on a second magnet disposed on the docking component; an alignment guide adapted to axially align the docking component to the access port dependent on the magnetic force; and a plurality of rotational alignment guides adapted to rotationally position the docking component in the apparatus dependent on the magnetic force.

According to another aspect of one or more embodiments of the present invention, a satellite capable of docking with a host vehicle comprises: an access port adapted to receive at least one service from the host vehicle; a first magnet adapted to induce a coupled magnetic field with a second magnet disposed on the host vehicle; a plurality of rotational alignment guides adapted to engage with a corresponding plurality of rotational alignment guides disposed on the host vehicle dependent on the coupled magnetic field; and a plurality of detents arranged to engage with a plurality of metal balls housed in the host vehicle to secure the access port to the host vehicle.

According to another aspect of one or more embodiments of the present invention, a mechanism for docking a satellite to a host vehicle comprises (i) the satellite having a docking component having: a first access port arranged to receive a service from the host vehicle; a first magnet; a first plurality of rotational alignment guides; and a plurality of detents, and (ii) the host vehicle having a docking component having: a second access port through which the service is communicated to the satellite; a second magnet arranged to induce a coupled magnetic field with the first magnet; a second plurality of rotational alignment guides arranged to engage the first plurality of rotational alignment guides dependent on the coupled magnetic field, and a plurality of metal balls arranged to engage with the plurality of detents.

According to another aspect of one or more embodiments of the present invention, a method of docking a satellite to a host vehicle comprises: inducing a first coupled magnetic field between a docking component of the satellite and a docking component of the host vehicle; axially aligning the docking component of the satellite with the docking component of the host vehicle dependent on the first coupled magnetic field; rotationally positioning the docking component of the satellite in the docking component of the host vehicle dependent on the first coupled magnetic field; and mechanically securing the docking component of the satellite with the docking component of the host vehicle.

According to another aspect of one or more embodiments of the present invention, a docking mechanism comprises (i) a first component having: a first access port; a first magnet disposed around the first access port; a first plurality of rotational alignment guides disposed around a periphery of the first magnet; an alignment guide disposed around a periphery of the first magnet; and a plurality of metal balls arranged to mechanically protrude from a surface of the first component, and (ii) a second component having: a second access port arranged to correspond with the first access port; a second magnet disposed around the second access port; a second plurality of rotational alignment guides disposed around a periphery of the second magnet and arranged to correspond with the first plurality of rotational alignment guides; and a plurality of detents arranged to correspond with the plurality of metal balls.

According to another aspect of one or more embodiments of the present invention, a docking mechanism comprises (i) a first component comprising: a first access port having a first perimeter; a first magnet having a second inner and second outer perimeter wherein the second inner perimeter is disposed in close proximal relationship with the first access port's first perimeter; and a first plurality of rotational alignment guides having a first outer surface wherein the first plurality of rotational alignment guides is disposed in close proximal relationship with the first magnet's second outer perimeter, and (ii) a second component comprising: a second access port having a third perimeter wherein the second access port is arranged to correspond with the first access port in size and shape; a second magnet having a fourth inner and fourth outer perimeter wherein the fourth inner perimeter is disposed in close proximal relationship with the second access port's third perimeter; and a second plurality of rotational alignment guides disposed in proximal relationship with the second magnet and arranged to correspond with the first plurality of rotational alignment guides in size, shape, number, and pattern. The first magnet may be disposed continuously around the periphery of the first access port's first perimeter. The second magnet may be disposed continuously around the periphery of the second access port's third perimeter. The first plurality of rotational alignment guides may be disposed continuously around the first magnet's second outer perimeter. The second plurality of rotational alignment guides may be disposed continuously around the periphery of the second magnet. The first magnet may be an electromagnet or a permanent magnet. The second magnet may be an electromagnet or a permanent magnet.

Other aspects and advantages of the invention will be apparent from the following description and the appended claims.

BRIEF DESCRIPTION OF DRAWINGS

FIG. 3A-1 shows a portion of the docking mechanism shown in FIG. 3A.

FIG. 3B-1 shows a portion of the docking mechanism shown in FIG. 3B.

FIG. 3C-1 shows a portion of the docking mechanism shown in FIG. 3C.

DETAILED DESCRIPTION

Embodiments of the present invention relate to a mechanism that uses a combination of magnetic and mechanical elements to facilitate docking of a satellite to a host vehicle. More particularly, in one or more embodiments of the present invention, a docking mechanism uses magnetic fields to provide a self-centering attracting force for axial alignment of a portion of the docking mechanism on a satellite and a portion of the docking mechanism on a host vehicle.

Figure 1:
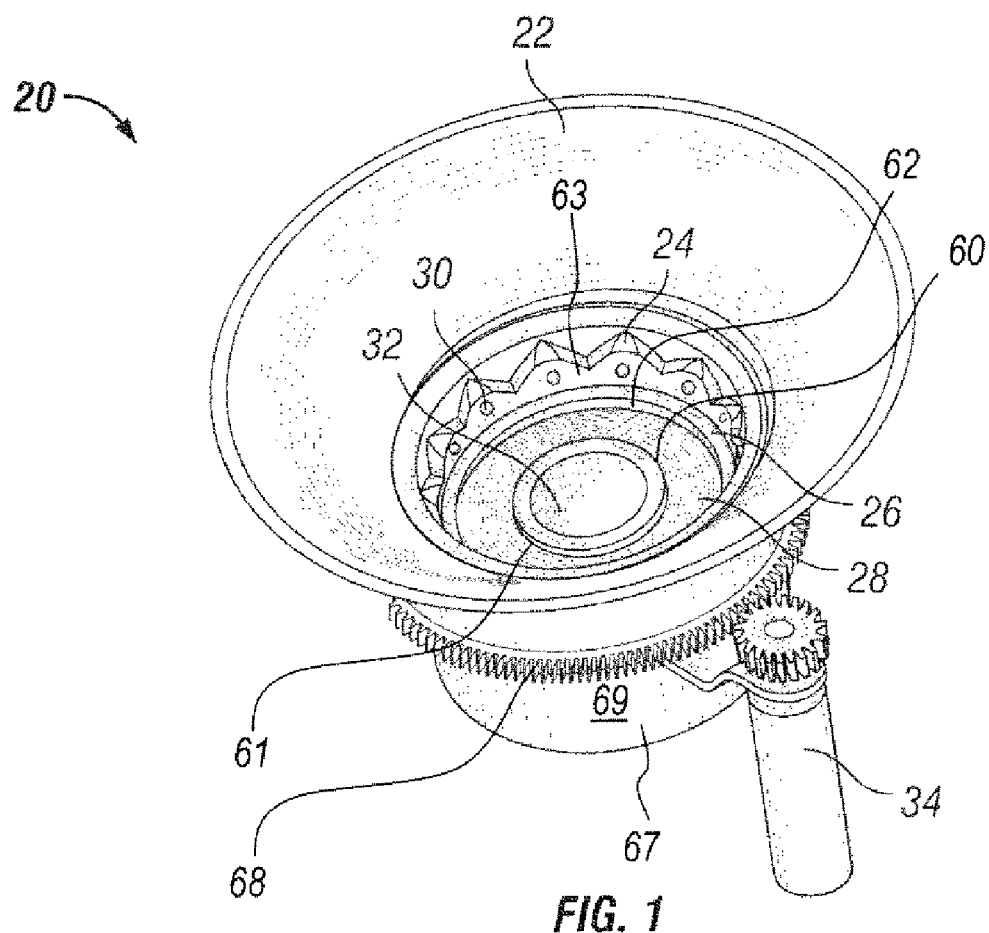
FIG. 1 shows a portion of a docking mechanism in accordance with an embodiment of the present invention.

A docking mechanism in accordance with embodiments of the present invention is described herein as having two main components: a docking "port" or receiving structure residing on a host vehicle (or "parent" vehicle) and a docking "cluster" or target structure residing on a satellite (or, more generally, a "docking vehicle"). FIG. 1 shows an exemplary docking port 20 in accordance with an embodiment of the present invention. The docking port 20 has an alignment guide 22, rotational alignment guides 24, a magnet core 26, an electromagnet 28 having a second inner perimeter 61 and a second outer perimeter 62, a ball-lock mechanism 30, an axial access port 32 having a first perimeter 60, a first housing 67, a gear track 68, and a drive motor 34, each of which is further described below. Further, as illustrated in FIG. 1, the first housing 67 partially encases the axial access port 32, rotational alignment guides 24, magnet core 26, and electromagnet 28.

Figure 2:
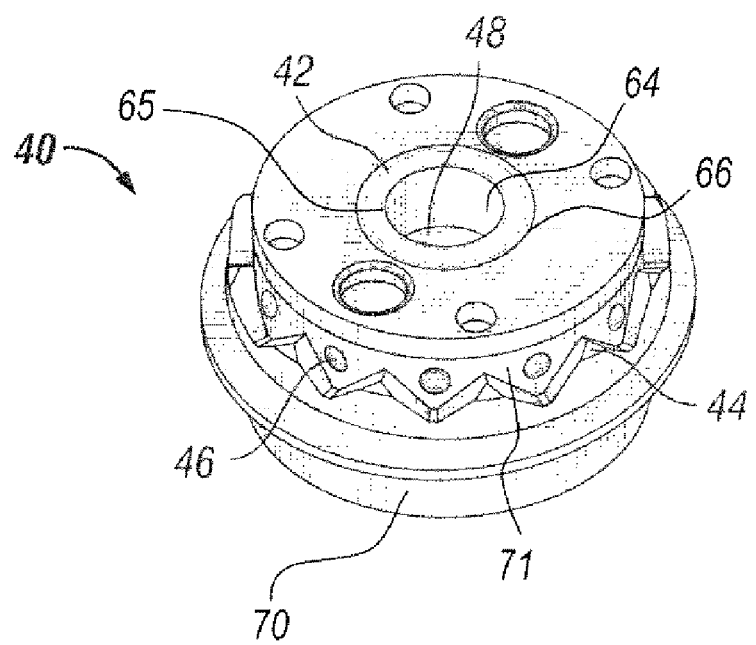
FIG. 2 shows a portion of a docking mechanism in accordance with an embodiment of the present invention.

FIG. 2 shows an exemplary docking cluster 40 in accordance with an embodiment of the present invention. The docking cluster 40 has an electromagnet 42 having a fourth inner perimeter 65 and a fourth outer perimeter 66, rotational alignment guides 44, ball-lock detents 46, a second housing 70, and an axial access port 48, each of which is further described below. Further, as illustrated in FIG. 2, the second housing 70 partially encases the axial access port 48 and electromagnet 42, wherein the second housing 70 has a third outer surface 71, and wherein the rotational alignment guides 44 are continuously disposed around the third outer surface 71.

At the start of a docking operation, the electromagnet 28 of the docking port 20 is turned "on" by passage of a current through a coil of the electromagnet 28. The electromagnet 42 is also turned "on." With the electromagnets 28, 42 "on," a vehicle (e.g., a satellite) on which the docking cluster 40 resides is positioned such that the docking cluster 40 is within a capture envelope of the docking port 20. As illustrated in FIG. 1, in an embodiment, electromagnet's 28 second inner perimeter 61 is disposed in close proximal relationship with and continuously around the axial access port's 32 first perimeter 60. Further, as illustrated in FIG. 2, in an embodiment, electromagnet's 42 fourth inner perimeter 65 is disposed in close proximal relationship and continuously around the axial access port's 48 third perimeter 64.

Further, in or more embodiments of the present invention, drive motor 34 is operably connected to the gear track 68 and may be used to rotationally position the docking port 20 so as to align the docking port 20 within some tolerance for initial misalignment with the docking cluster 40. In an embodiment, the first housing 67 has a second outer surface 69 and the gear track 68 may be attached to the first housing's second outer surface 69. For example, in one or more embodiments of the present invention, the docking port 20 may be capable of securing a docking cluster 40 that is initially misaligned as much as by 30%.

Those skilled in the art will note that the capture envelope of the docking port 20 may be dependent on one or more of various factors. For example, a strength of one or more of electromagnets 28, 42 may be considered in determining a capture envelope of the docking port 20. Moreover, the velocity, mass, and/or inertia of the satellite on which the docking cluster 40 resides may need to be considered when determining a capture envelope of the docking port 20.

As described above, in an embodiment, the docking port 20 and the docking cluster 40 each have an electromagnet. However, in one or more other embodiments of the present invention, either or both of the docking port 20 and the docking cluster 40 may use a different type of magnet. For example, the docking cluster 40 may use a permanent magnet having fixed strength and pole orientations.

As the electromagnet 42 of the docking cluster 40 is brought into the capture envelope of the docking port 20, electromagnets 28, 42 begin to interact and exert magnetic forces on each other, thereby resulting in a "coupled" magnetic field. The coupled magnetic field induced between electromagnets 28, 42 help align the docking cluster 40 both axially and in translation before physical contact is made between the docking port 20 and the docking cluster 40. Moreover, as the distance between the docking port 20 and the docking cluster 40 decreases, the strength of the coupled magnetic field induced between electromagnets 28, 42 increases, thereby more strongly drawing in the docking cluster 40 (and, hence, the satellite on which the docking cluster 40 resides) toward the docking port 20.

Further, as the docking cluster 40 is drawn into the docking port 20, the alignment guide 22 of the docking port 20 ensures the movement of the docking cluster 40 toward a center of the docking port 20. As shown in FIG. 1, the alignment guide 22 is one of at least partially conical and at least partially frustoconical in shape and is disposed in proximal relationship with and continuously around the rotational alignment guides 24. However, in one or more other embodiments of the present invention, the alignment guide 22 may be of a different shape. For example, the alignment guide 22 may be at least partially elliptical, spherical, or frustospherical in shape.

Once the distance between the docking port 20 and the docking cluster 40 is such that the rotational alignment guides 24 of the docking port 20 and the rotational alignment guides 44 of the docking cluster 40 are in contact, the rotational alignment guides 24, 44 provide further rotational alignment into one of a plurality of positions. As illustrated in FIGS. 1 and 2, the rotational alignment guides 24, 44 correspond with each other in size, shape, number, and pattern. Those skilled in the art will note that number of positions into which the docking port 20 and the docking cluster 40 may be aligned is dependent on the number of rotational alignment guides 24, 44 present in the docking port 20 and the docking cluster 40, respectively. As illustrated in FIG. 1, in an embodiment, the rotational alignment guides 24 are disposed in close proximal relationship with and continuously around the electromagnet's 28 second outer perimeter 62. Further, as illustrated in FIG. 2, in an embodiment, the rotational alignment guides 44 are disposed around a periphery of electromagnet 42.

Once the rotational alignment guides 24 of the docking port 20 and the rotational alignment guides 44 of the docking cluster 40 are mated with each other, the ball-lock mechanism 30 of the docking port 20 may be activated by drive motor 34 such that metal balls (shown, but not labeled) are caused to protrude from a surface of the docking port 20 into respective ball-lock detents 46 of the docking cluster 40, thereby securing or "hard locking" the docking cluster 40 in the docking port 20. In an embodiment, the rotational alignment guides 24 have a first outer surface 63 and a plurality of ball-lock mechanisms 30 mechanically protrude from the first outer surface 63. In an embodiment, the ball-lock mechanism is comprised of a metal ball. Those skilled in the art will note that prior to such hard locking, the docking cluster 40 may be described as being in "soft dock" with the docking port 20.

In one or more embodiments of the present invention, once the ball-lock mechanism 30 of the docking port 20 is successfully activated, the electromagnet 28 of the docking port 20 and the electromagnet 42 of the docking cluster 40 may be turned "off."

After the docking port 20 and the docking cluster 40 are hard locked, services may be communicated from the docking port 20 to the docking cluster 40 via the axial access port 32 of the docking port 20 to which the axial access port 48 of the docking cluster 40 has been aligned through use of the rotational alignment guides 24, 44. Such services may include, but are not limited to, fuel, data, and power. As illustrated in FIG. 1, axial access ports 32 and 48 correspond with each other in size and shape.

Figure 3A:
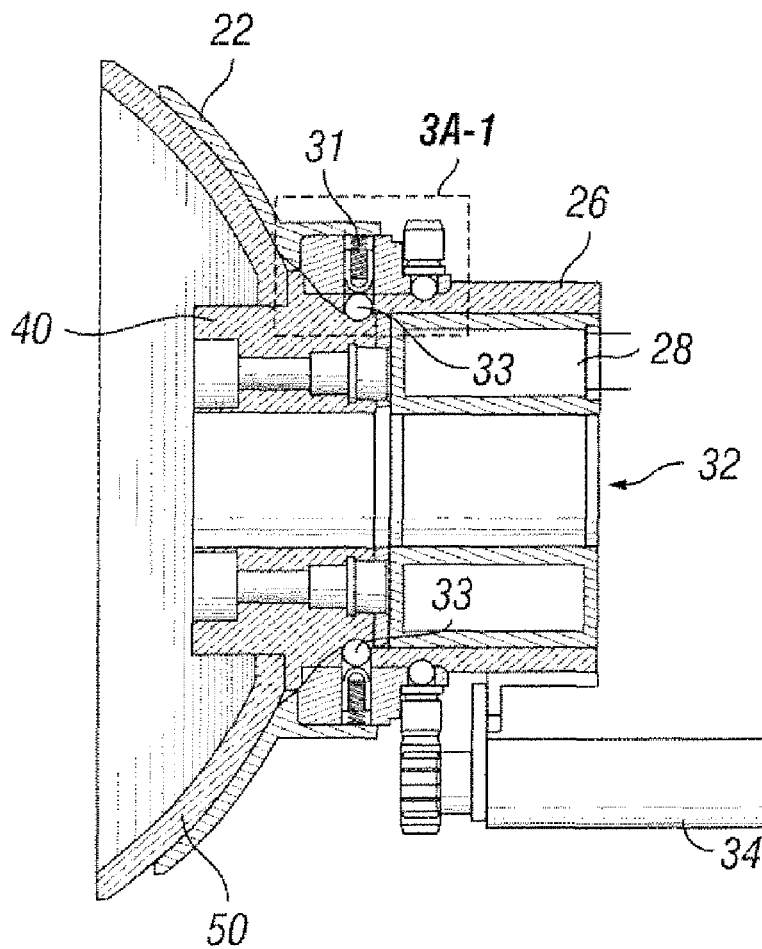
FIG. 3A shows a cross-sectional view of a docking mechanism in accordance with an embodiment of the present invention.
Figures 1, 3A:
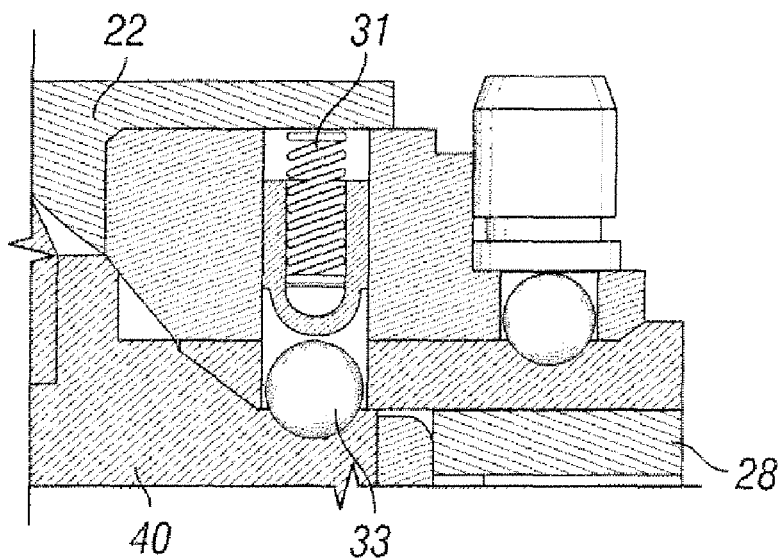

As described above, the docking cluster 40 may be in "soft" dock or "hard" dock with the docking port 20. The state of the docking cluster 40 may be related to the position of the metal balls of the ball-lock mechanism 30 of the docking port 20. As shown in FIG. 3A, when in "soft" dock, metal balls 33 are flexibly held by springs 31 in the docking port 20. The tension of the springs 31 may be such that the metal balls 33 are allowed to be pressed into the docking port 20 as a surface of the docking cluster 40 passes over the metal balls 33. In one or more embodiments of the present invention, the position/state of the metal balls 33 may be dependent on a rotation of the ball-lock mechanism 30 by drive motor 34.

Figure 3B:
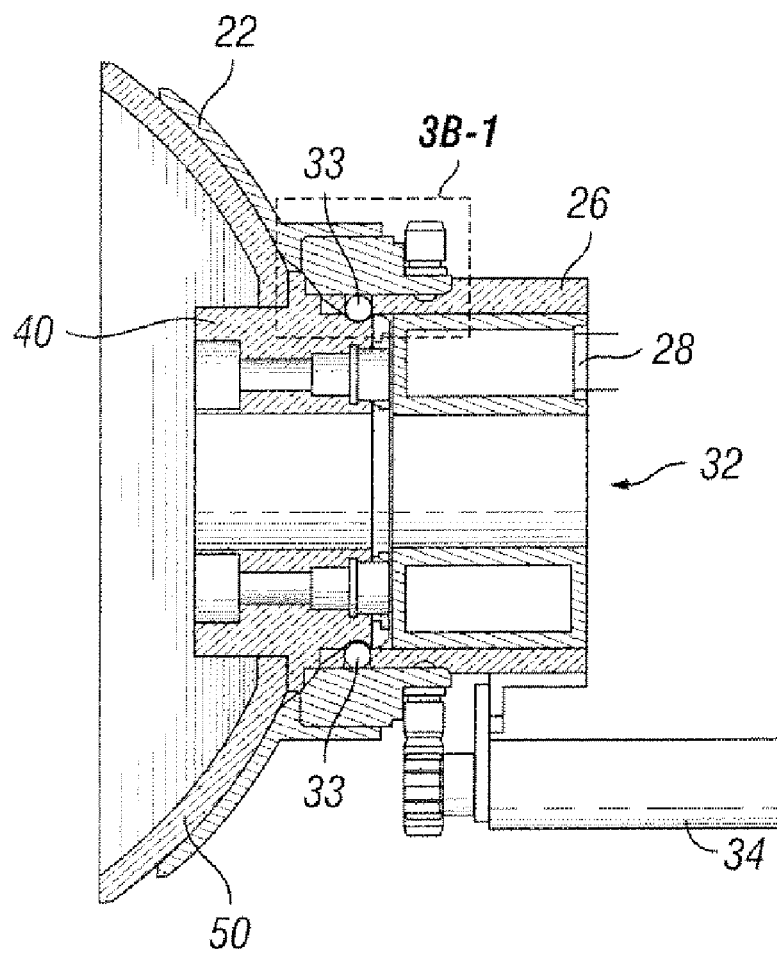
FIG. 3B shows a cross-sectional view of a docking mechanism in accordance with an embodiment of the present invention.
Figures 1, 3B:
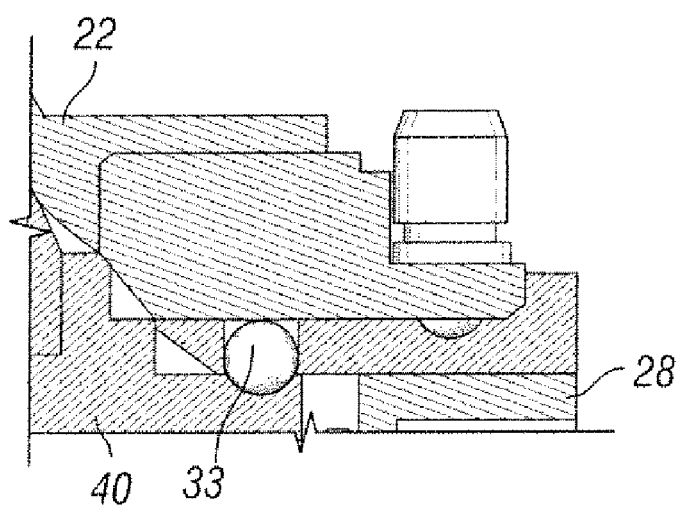

Now referring to FIG. 3B, the docking cluster 40 is caused to be in "hard" dock with the docking cluster 40 by drive motor 34 turning the ball-lock mechanism 30 to a position in which metal balls 33 are rigidly held such that a portion of each metal ball 33 is secured within a corresponding ball-lock detent 46 of the docking cluster 40.

Figure 3C:
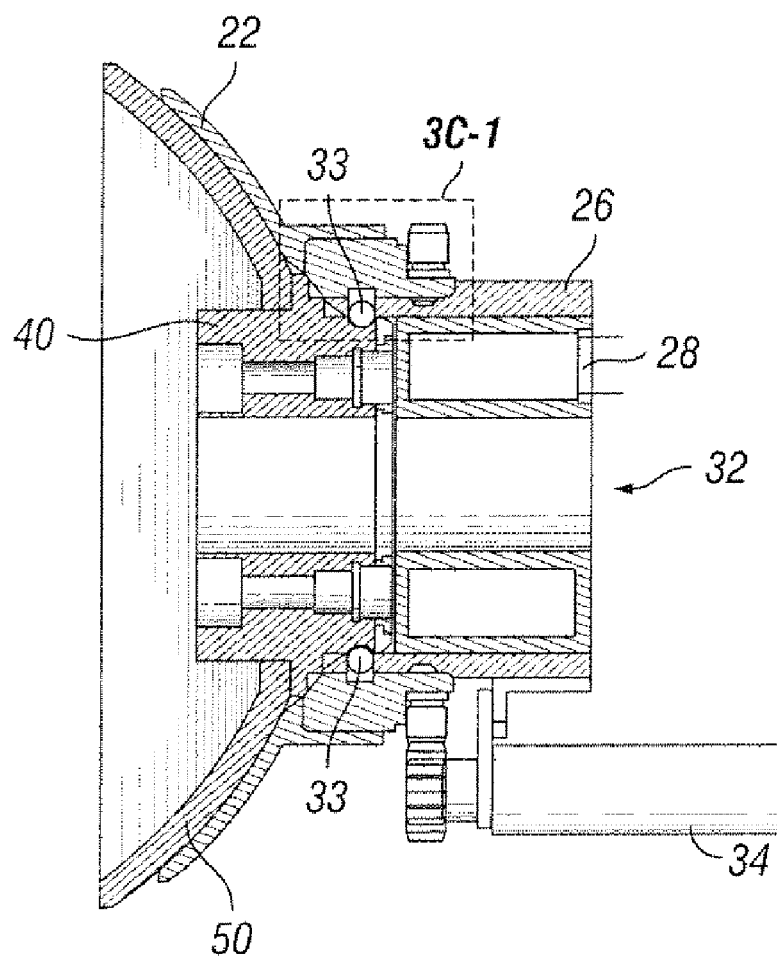
FIG. 3C shows a cross-sectional view of a docking mechanism in accordance with an embodiment of the present invention.
Figures 1, 3C:
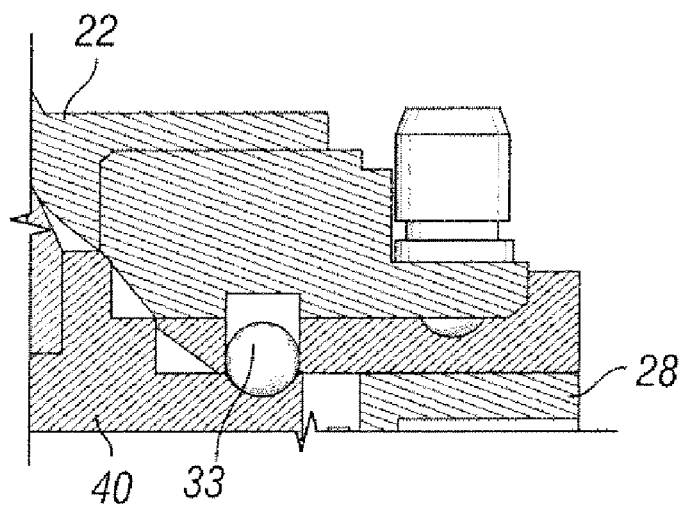

Upon completion of communication of a service between the docking port 20 and the docking cluster 40 or when desired, the docking cluster 40 is "released" from the docking port 20. During a release operation, the ball-lock mechanism 30 of the docking port 20 may be deactivated. In other words, as shown in FIG. 3C, the metal balls 33 may be released (e.g., allowed to "float" within some recess) or retracted so as not to engaged with the ball-lock detents 46 of the docking cluster 40. In such a case, once the docking port 20 and the docking cluster 40 are no longer "hard" locked, the docking cluster 40 may be caused to move away from the docking port 20 by, for example, the host vehicle on which the docking port 20 resides. In one or more other embodiments of the present invention, during a release operation, one or more of the electromagnets 28, 42 may be turned "on" by application of current in a direction reverse to that applied during the docking operation. Using such a technique, the docking cluster 40 may be actively "pushed away" from the docking port 20. Further, those skilled in the art will note that in one or more embodiments of the present invention, the current applied to one or both of the electromagnets 28, 42 during a release operation may be controlled so as to impart a particular velocity on the released docking cluster 40.

Still referring to FIGS. 3A-3C, those skilled in the art will note that the alignment guide 22 of the docking port 20 may be shaped in accordance with a shape of a satellite 50 of which the docking cluster 40 is part.

Further, referring again to FIGS. 1 and 2 and as discernible from FIGS. 3A-3C, the docking port 20 and the docking cluster 40 are circular in shape. However, in one or more embodiments of the present invention, the docking port 20 or parts thereof and/or the docking cluster 40 or parts thereof may not be circular in shape.

Those skilled in the art will note that the host vehicle on which the docking port 20 resides may be a satellite itself. For example, in one or more embodiments of the present invention, a parent satellite may deploy one or more smaller satellites to inspect and repair the parent satellite. In such an arrangement, the parent satellite may have a docking port to engage with a docking cluster residing on one of the smaller satellites.

Advantages of the present invention may include one or more of the following. In one or more embodiments of the present invention, a docking mechanism may be used to retrieve and/or deploy micro and/or nano satellites.

In one or more embodiments of the present invention, a docking mechanism may allow a small satellite, carried aboard a larger host vehicle, such as a telecommunications satellite, a space station, or space shuttle, to perform routine inspections of the host vehicle.

In one or more embodiments of the present invention, a docking mechanism induces a coupled magnetic field between a docking port and a docking cluster for a self-centering attractive force for axial alignment of the docking port and the docking cluster.

In one or more embodiments of the present invention, visual observation and/or control of a docking mechanism may not be necessary when performing a docking operation of a satellite to a host vehicle.

In one or more embodiments of the present invention, a docking mechanism may allow a satellite to be "pushed away" from a host vehicle at a desired velocity during a release operation.

In one or more embodiments of the present invention, a component of a docking mechanism residing on a satellite may be passive and a component of the docking mechanism residing on a host vehicle may have active parts (e.g., a ball-lock mechanism).

In one or more embodiments of the present invention, a docking mechanism may be used that has a relatively wide range of tolerance for initial misalignment of a docking component of a satellite with a docking component of a host vehicle.

In one or more embodiments of the present invention, once a component of a docking mechanism residing on a satellite is within a capture envelope of a component of the docking mechanism residing on a host vehicle, further positioning of the host vehicle may not be necessary.

In one or more embodiments of the present invention, a docking mechanism may hard lock a satellite to a host vehicle to allow for communication of services between the satellite and the host vehicle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A areospace docking mechanism, comprising:
   a first component comprising:
      a first access port having a first perimeter;
      a first magnet having a second inner and second outer perimeter wherein the first magnet is disposed in close proximal relationship with the first access port's first perimeter;
      a first plurality of rotational alignment guides having a first outer surface wherein the first plurality of rotational alignment guides is disposed in close proximal relationship with the first magnet's second outer perimeter;
      an alignment guide disposed in proximal relationship with and continuously around the first plurality of rotational alignment guides; and
      a plurality of metal balls arranged to mechanically protrude from the first outer surface of the first plurality of rotational alignment guides; and
   a second component comprising:
      a second access port having a third perimeter wherein the second access port is arranged to correspond with the first access port in size and shape;
      a second magnet having a fourth inner and fourth outer perimeter wherein the second magnet is disposed in close proximal relationship with the second access port's third perimeter; and
      a second plurality of rotational alignment guides disposed in proximal relationship with the second magnet and arranged to correspond with the first plurality of rotational alignment guides in size, shape, number, and pattern.

2. The areospace docking mechanism of claim 1, wherein the second component is further comprised of:
   a plurality of detents arranged to correspond with the plurality of metal balls.

3. The areospace docking mechanism of claim 1, wherein the alignment guide is one of at least partially conical, at least partially frustoconical, at least partially spherical, at least partially frustospherical, and at least partially elliptical in shape.

4. The areospace docking mechanism of claim 1, wherein at least one of the first magnet and the second magnet is an electromagnet.

5. The areospace docking mechanism of claim 1, wherein both the first magnet and second magnet are electromagnets.

6. The areospace docking mechanism of claim 1, wherein the first component is capable of correcting an initial misalignment between the first component in reference to the second component and wherein the initial misalignment is less than about 10 percent.

7. The areospace docking mechanism of claim 1, wherein the first component is capable of correcting an initial misalignment between the first component in reference to the second component and wherein the initial misalignment is less than about 20 percent.

8. The areospace docking mechanism of claim 1, wherein the second component is further comprised of:
   a second housing at least partially encasing the second access port and second magnet, wherein the second housing has a third outer surface, and wherein the second plurality of rotational alignment guides is continuously disposed around the third outer surface.

9. The areospace docking mechanism of claim 1, wherein the first magnet is disposed continuously around the periphery of the first access port's first perimeter.

10. The areospace docking mechanism of claim 1, wherein the second magnet is disposed continuously around the periphery of the second access port's third perimeter.

11. The areospace docking mechanism of claim 1, wherein the first plurality of rotational alignment guides is disposed continuously around the first magnet's second outer perimeter.

12. The areospace docking mechanism of claim 1, wherein the second plurality of rotational alignment guides is disposed continuously around the periphery of the second magnet.

13. The areospace docking mechanism of claim 1, wherein the first component is further comprised of:
   a first housing at least partially encasing the first access port, first magnet, and first plurality of rotational alignment guides wherein the first housing has a second outer surface;
   a gear track attached to the first housing's second outer surface; and
   a drive motor operably connected to the gear track.

14. The areospace docking mechanism of claim 13, wherein the first component is capable of correcting an initial misalignment between the first component in reference to the second component and wherein the initial misalignment is less than or equal to about 30 percent.

* * * * *